US007827781B2

(12) United States Patent
Bendel

(10) Patent No.: US 7,827,781 B2
(45) Date of Patent: Nov. 9, 2010

(54) LIQUID PROPELLANT ROCKET ENGINE WITH PINTLE INJECTOR AND ACOUSTIC DAMPENING

(76) Inventor: Timothy B. Bendel, 609 Windmill Rd., Chugwater, WY (US) 82210

( * ) Notice: Subject to any disclaimer, the term of this patent is extended or adjusted under 35 U.S.C. 154(b) by 799 days.

(21) Appl. No.: 11/526,990

(22) Filed: Sep. 26, 2006

(65) Prior Publication Data
US 2007/0062176 A1 Mar. 22, 2007

Related U.S. Application Data

(60) Provisional application No. 60/742,396, filed on Dec. 5, 2005.

(51) Int. Cl.
*F02K 9/00* (2006.01)
(52) U.S. Cl. .......................... 60/257; 60/258
(58) Field of Classification Search ............ 60/257, 60/258, 250
See application file for complete search history.

(56) References Cited

U.S. PATENT DOCUMENTS

| 3,534,555 | A | * | 10/1970 | Ayvazian | 60/217 |
|---|---|---|---|---|---|
| 3,581,495 | A | * | 6/1971 | Kah, Jr. | 60/742 |
| 3,603,092 | A | * | 9/1971 | Paine et al. | 60/258 |
| 3,662,547 | A | * | 5/1972 | Paine et al. | 60/258 |
| 3,695,041 | A | * | 10/1972 | Eggers et al. | 60/264 |
| 3,780,952 | A | * | 12/1973 | Huang | 239/424.5 |
| 4,019,319 | A | * | 4/1977 | Oda et al. | 60/39.464 |
| 4,073,138 | A | * | 2/1978 | Beichel | 60/245 |
| 4,801,092 | A | * | 1/1989 | Webber et al. | 239/418 |
| 5,582,001 | A | * | 12/1996 | Bradford et al. | 60/251 |
| 5,794,435 | A | * | 8/1998 | Jones | 60/251 |
| 5,857,323 | A | * | 1/1999 | Beveridge et al. | 60/258 |
| 6,185,927 | B1 | * | 2/2001 | Chrones et al. | 60/258 |
| 6,378,291 | B1 | * | 4/2002 | Schneider | 60/218 |
| 6,865,878 | B2 | * | 3/2005 | Knuth et al. | 60/258 |
| 7,685,807 | B2 | * | 3/2010 | Watkins et al. | 60/258 |
| 2005/0241294 | A1 | * | 11/2005 | Cesaroni | 60/251 |
| 2006/0230745 | A1 | * | 10/2006 | Hasegawa et al. | 60/258 |
| 2010/0037590 | A1 | * | 2/2010 | Brown et al. | 60/258 |

OTHER PUBLICATIONS

Huzel, D.K., et al., "Modern Engineering for Design of Liquid-Propellant Rocket Engines," 1992, pp. 127-134, vol. 147; AIAA; Washington, DC; ISBN 1-56347-013-6.
Sutton, G.P., "Rocket Propulsion Elements," 1986, pp. 184-193, 208-215; 5th ed.; John Wiley & Sons, New York, NY; ISBN 0-471-80027-9.
Sutton, G.P., "Rocket Propulsion Elements," 1992, p. 278; 6th ed.; John Wiley & Sons, New York, NY; ISBN 0-471-52938-9.
Sutton, G.P., et al., "Rocket Propulsion Elements," 2001, pp. 353, 358-359; 7th ed.; John Wiley & Sons, New York, NY; ISBN 0-471-32642-9.

* cited by examiner

*Primary Examiner*—William H Rodriguez
(74) *Attorney, Agent, or Firm*—Rod D. Baker

(57) ABSTRACT

A liquid propelled rocket engine comprising a unique pintle injector, radial injector plate and ablative insert to improve combustion stability and reduce harmonic disturbance within the chamber. The injector plate is generally in the shape of a ring surrounding a combination spud and pintle injector, the two allowing at least one liquid propellant and one liquid oxidizer to be injected into the chamber. The injector plate has an array of injectors for injecting liquid propellant into the chamber and a series of cavities within allowing the harmonic disturbance to be damped and providing a more stable combustion environment. The number of cavities and the unique pintle injector's length and width are chosen to reduce harmonic disturbance in the longitudinal, radial and lateral modes. A method for designing engine components and tuning harmonic frequencies within a combustion chamber is also disclosed.

31 Claims, 5 Drawing Sheets

LIQUID PROPELLANT ROCKET ENGINE WITH PINTLE INJECTOR AND ACOUSTIC DAMPENING

RELATED U.S. APPLICATION DATA

This application claims priority from Provisional Application No. 60/742,396 filed Dec. 5, 2005, the entire disclosure of which is incorporated herein by reference.

BACKGROUND OF THE INVENTION

1. Field of the Invention (Technical Field)

This invention relates to the field of aerospace propulsion systems; more particularly, the invention relates to a liquid propellant rocket propulsion system design incorporating a pintle injector, radial injector plate and an ablative insert oriented to dampen resonant harmonic frequencies within the combustion chamber.

2. Background Art

Liquid propelled rocket engines are typically used to launch and guide orbital and sub-orbital vehicles and satellites. These engines typically include at least one injector element, a combustion chamber, a throat and a nozzle element. The injector element serves primarily to control the flow of the liquid propellants in order to achieve a desired mixture of fuel and oxidizer. Commonly these injectors accomplish an improved rate of combustion by impinging or atomizing the liquid propellants inside the combustion chamber, and provide efficient combustion and stability to the internal pressure of the combustion chamber.

As the liquid propellant is introduced into the combustion chamber and atomized, it is then ignited, creating a rapid expansion of gases which are emitted through the nozzle. The nozzle is designed to efficiently transfer this energy into a driving force, which propels the vehicle or satellite in the opposite direction of the exhaust. However, the forces created during the combustion cycle do not have to be time invariant and can oscillate. These forces can create pressure waves that resonate at a frequency that causes harmonic disturbance and instability within the combustion chamber. The harmonic resonance may exist in either the longitudinal, lateral or radial mode, or a combination of the three. The longitudinal resonance is often multiplied by the effect of the variable back-pressure created at the injector, and thus causes a varying flow rate through the injector. This leads to varying thrust from the engine known as the "pogo" effect. These problems decrease the efficiency of the engine while increasing the likelihood of engine failure, and can also cause other performance related problems.

Prior art references have recently disclosed means for improving combustion stability. Some of these references disclose the use of baffles to reduce amplification of the resonant frequencies. One problem presented by these methods is the difficulty with replacing deteriorated parts due to their location near the head of the chamber. These methods frequently require the use of a coolant to prevent the baffles from becoming damaged during the combustion cycle, and do not provide phased damping methods to eliminate multiple orders of combustion instability.

Other problems include the loss of fuel within the chamber as it comes into contact with the combustion chamber walls. This liquid fuel does not atomize, and due to the high temperature within the chamber may boil and cause damage to the structure. This problem is further complicated as liquid oxygen or other cryogenic liquid injected in to the chamber is not properly impinged or vaporized, causing undesired combustion along the chamber wall and potentially creating further harmonic disturbance. This disturbance can actually decrease the rate of combustion by forcing the propellants in a direction away from the igniter. Although some engines disclose methods of distributing coolant along the outside of the chamber, either by a milled channel, platelet or tubular means, the outside of the chamber still reaches temperatures where the liquid oxygen or other liquid can cause damage and increase the risk of engine failure.

Other problems exist in the prior art relating to injection heads and distribution manifolds. Typical injector elements are machined to control the distribution of the liquid fuel, but often risk combustion instability in order to achieve efficiency. Some require numerous injector heads and complex tubing to distribute the liquid propellant evenly throughout the chamber. In addition, these types of machined injector plates present difficulties when scaling their manufacturing process due to the large number of machined injection points, and often require significant time for even minor design modifications. Thus, the traditional designs for liquid rocket engines have been very costly to produce and test in order to insure reliability. This cost is unacceptable for the Private Space Industry that must raise money on the open market rather than obtain government awarded development funds. The increased costs of testing and manufacturing often prohibit the ability for Private Space companies to provide services to private citizens.

Other systems teach a pintle injector to achieve combustion stability. By introducing the propellant from a center point in the chamber, the combustion cycle can be made more dynamically stable along the radial axis. However, there often remains a problem presented by instability along the longitudinal axis, which may be amplified by the presence of the pintle head inside the combustion chamber. Other methods of injecting propellants from a single pintle have been disclosed, but also fail to distribute the atomized gases evenly throughout the chamber. Another family of injector manifolds, referred to as coaxial pintle injectors, attempt to simplify the engineering and design process and reduce cost. In these designs both the oxidizer and the fuel is fed into the combustion chamber. The pintle often is designed with two sets of radial holes near its tip, one for oxidizer and one for fuel. These holes are designed to spray both the oxidizer and fuel streams into each other to achieve efficient mixing.

However, in practice the coaxial pintle design has proven to be expensive and problematic. Coaxial pintles are still sensitive to combustion instabilities, and the relative simplicity of the design leaves little to be changed in order to correct for this phenomena. In addition, the coaxial pintle is difficult to design and often requires extensive testing, which in turn drives up the cost of manufacturing.

Other methods have disclosed the use of an ablative material to insulate the chamber walls during the combustion cycle. Ablatives are also advantageous because they often eliminate the need for a complex cooling system and reduce the overall weight and complexity of the chamber. Typically, ablative chambers are comprised of an epoxy-resin or phenolic material, which during the combustion cycle vaporize and cool the adjacent chamber wall surface. As the material vaporizes it cools the chamber wall and leaves behind a layer of char, further insulating the chamber wall from the combustion elements and limiting deterioration. The particular thickness of the ablative wall depends on the heat generated during the combustion cycle and the internal pressure in the chamber. Therefore, many of the prior art references for ablative materials disclose varying profiles and thicknesses to meet the particular needs of their engine design. Many of these ablative chamber linings require significant time and effort to replace between launches. Therefore, a need also arises to provide an ablative material insert that provides ease of replacement and accounts for combustion instability along its contour.

It is therefore one object of the present invention to provide a unique combination spud and pintle injector, where the geometry of the injector is chosen in relation to the geometry of the combustion chamber to damp resonant frequencies.

It is another object of the invention to provide a combination spud and pintle injector which further provides spray intersection points in desired quantities and at desired locations to damp resonant frequencies within the combustion chamber.

It is another object of the invention to provide a radial injector plate surrounding the combination spud and pintle injector, where the geometry of the radial injector plate is chosen in relation to the geometry of the combustion chamber to damp resonant frequencies.

It is another object of the invention to provide a radial injector plate which further provides spray intersection points to damp resonant frequencies within the combustion chamber.

It is another object of the invention to provide a certain number of acoustic chambers within a radial injector plate which include igniters and independent injection elements, and which may be tuned to damp various resonant frequencies within the combustion chamber.

It is another object of the invention to provide a feedback control loop for damping axis oscillation detected within a certain number of acoustic chambers within a radial injector plate.

It is another object of the invention to provide a propellant accumulator external to the engine manifold, thus eliminating the requirement of a turbo pump or other device to provide propellant to the injectors, and which may be tuned to damp longitudinal resonant frequencies occurring in the engine manifold and the vehicle.

It is another object of the invention to provide an ablative insert to improve the stability of the combustion cycle, to protect the interior of the combustion chamber shell, and which is designed to reduce harmonic disturbance within the chamber.

These and other benefits of the present invention in its various embodiments will become apparent from the specification and appended claims.

BRIEF DESCRIPTION OF THE DRAWINGS

The accompanying drawings, which are incorporated into and form a part of the specification, illustrate several views of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

A preferred embodiment of the present invention is illustrated in FIGS. 1-6. It is to be expressly understood that the descriptive embodiment is provided herein for explanatory purposes only and is not meant to unduly limit the claimed inventions. Other embodiments of the present invention are considered to be within the scope of the claimed inventions, including not only those embodiments that would be within the scope of one skilled in the art, but also as encompassed in technology developed in the future. Although liquid oxygen and kerosene are often used as an exemplar combination in describing this invention, it is merely one example of said combination. Liquid oxygen and kerosene is discussed primarily for the purposes of understanding the system and method application. It is to be expressly understood that other oxidizers and propellants are considered to be within the scope of the present invention as well.

As will be understood by those familiar with the art, the present invention may be embodied in other specific forms without departing from the spirit or essential characteristics thereof. For example, the present invention is not limited to use with only one type or combination of propellants. The present invention is also not limited for use with a space vehicle or satellite. Accordingly, the disclosure of the preferred embodiment of the invention is intended to be illustrative, but not limiting, of the scope of the invention which is set forth in the claims.

Figure 1:
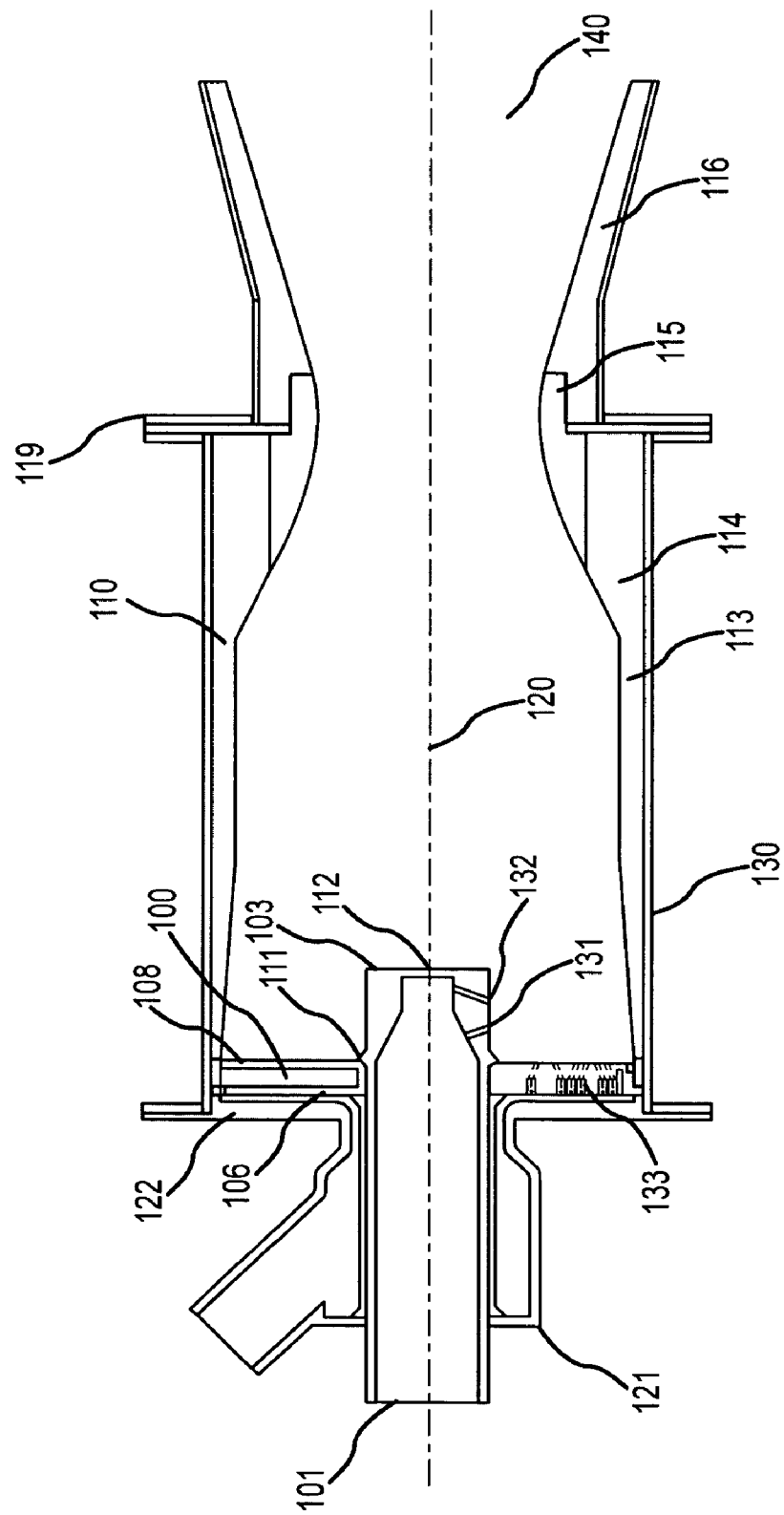
FIG. 1 is a cross-sectional view of the engine assembly in a preferred embodiment.

Referring in detail to FIG. 1, a cross-section of the engine assembly in a preferred embodiment is shown. A pressurized liquid oxygen tank 101 is configured towards the head of the combustion chamber 120 and surrounded by the propellant accumulator 121 and injection manifold 122. Liquid oxygen tank 101 is coupled to a combination spud and pintle injector head or "Spintle™" injector 103 and allows liquid oxygen to be injected into chamber 120 via a series of injector channels 131, 132 machined towards the distal end and surrounding spintle injector 103. Spintle injector 103 includes a ridge element 111 along its circumference which comes in to contact with the injector plate 100 on the chamber side as described in greater detail below. Spintle injector 103 may also have a thin channel 112 at or near the radial center point for bleeding liquid oxygen at a minimum velocity to prevent stagnation at that point inside chamber 120.

Injector plate 100 is generally in the shape of a ring surrounding spintle injector 103 and allowing at least one liquid propellant to be injected into chamber 120. Liquid propellant is distributed to injector plate 100 via propellant manifold 121. Injector plate 100 has an array of injector holes 133 for injecting liquid propellant into chamber 120 as described in greater detail below in relation to FIGS. 3-5. In a preferred embodiment, injector plate 100 has a base section 106 having a larger radius than the top plate 108 facing chamber 120 as described in greater detail below.

An ablative insert 110 is shown extending throughout chamber 120. In a preferred embodiment, insert 110 has a gradual slope away from the chamber walls for a first portion 113 to facilitate fuel adhesion to the walls for cooling purposes, and then in a preferred embodiment extends more drastically away from the chamber walls in a second portion 114. In a preferred embodiment, this second portion 114 widens at approximately thirty degrees in order to construct the nozzle's throat. The distance between the injector plate and the nozzle throat establishes a first longitudinal resonance frequency at a specific chamber pressure. The distance between the nozzle throat and the flat, circular portion of the spintle injector 103 establishes a second longitudinal resonance frequency. This distance is chosen by the length of the spintle injector 103 extending into chamber 120 and is designed to be an integer of the integral half-frequency of the first frequency. Thus, any longitudinal wave propagation is damped out in order to provide combustion stability. Insert 110 then curves back away from the center of chamber 120 and adjacent to nozzle assemble 140 in a third portion 116, and terminates at the end of nozzle assembly 140. Insert 110 may vary in thickness to accommodate the engine geometry and varying temperature and pressure within chamber 120.

In a preferred embodiment, the thickness of insert 110 increases as it approaches nozzle assembly 140 to accommodate for the high temperature at that point in chamber 120. Adjacent insert 110 and along the length of second and third portion 114, 116 of the chamber wall is a graphite material layer 115 that resists erosion by the high speed hot exhaust in this region. In alternate embodiments, other heat-dissipative material may be used in addition to this graphite layer 115 to accomplish this goal.

Insert 110 performs similarly to other ablative materials in that it cools the chamber walls. In a preferred embodiment insert 110 is used for a single launch operation. The ablative phenolic insert is easily replaced by removing connection points along the nozzle ring 119 to detach nozzle assembly 140 and expose the full diameter of chamber 120. Insert 110 may be extracted from the chamber and a replacement may be inserted with minimal time and effort.

Surrounding spintle injector 103, injector plate 100, ablative insert 110 and chamber 120 is a reinforced steel shell 130. Shell 130 provides the structural pressure to accommodate the necessary thrust to carry an attached vehicle, satellite or other payload into orbit. One skilled in the art will recognize that there are several materials other than steel which can accomplish this function, and that other designs in the overall assembly of shell 130 are possible without deviating from the spirit of the present invention.

Figure 2:
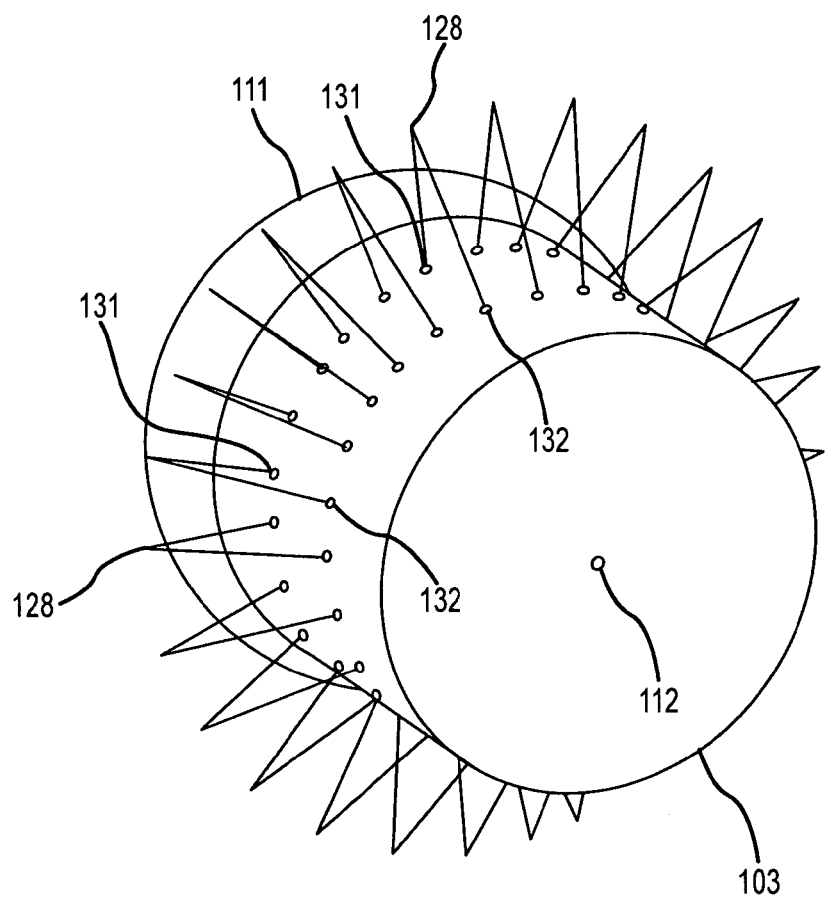
FIG. 2 is a perspective view of the injector element in a preferred embodiment.

Referring now in detail to FIG. 2, spintle injector 103 and the liquid oxygen distribution system in a preferred embodiment is shown. Spintle injector 103 allows liquid oxygen to be injected into chamber 120 via a series of injector channels 131, 132 machined towards the distal end and surrounding spintle injector 103 along its circumference. Injector channels 131, 132 are machined through spintle injector 103 at angles to allow intersection points of liquid oxygen at a set distance from spintle injector 103 and a set distance removed from the points of fuel stream intersection, and thereby become impinged and atomized within the chamber. In a preferred embodiment, injector channels 131, 132 are positioned a distance away from injector plate 100 in the range of 2-3 inches and allowing injected liquid oxygen streams to intersect approximately ¼-½ inches away from the points of intersection of injected fuel from injector head 100. In a preferred embodiment, these injector channels 131, 132 are machined at angles of twenty degrees from normal to accomplish these points of intersection. This configuration provides an ideal mixing of the fuel and oxidizer without either stream causing a disturbance in the other. Spintle injector 103 also has a thin channel 112 at or near the radial center point for bleeding liquid oxygen at a minimum velocity to prevent stagnation at that point inside chamber 120. Stagnation could lead to a reduction in cooling in this area, which might lead to a burn through. A ridge element 111 along the circumference of spintle injector 103 communicates with injector plate 100 on the chamber side. In a preferred embodiment, spintle is oriented so that the radial axes of array of injectors 133 are aligned with the radial axes of paired injector channels 131, 132 on spintle injector 103.

In a preferred embodiment, the diameter of spintle injector 103 is sized in relation to the diameter of chamber 120 to create radial damping pressure at an integer of the half-phase of the chamber frequency. This creates destructive interference of any radial pressure waves allowing the engine to run with a more constant pressure. The geometry of spintle injector 103 will depend on the geometry of the combustion chamber and the various harmonic resonant frequencies within the chamber, and may be determined from either predicted or measured resonant frequencies, or both. In a preferred embodiment the diameter of spintle injector 103 is in the range of 3-5 inches, with a corresponding interior chamber diameter in the range of 8-10 inches.

Figure 3:
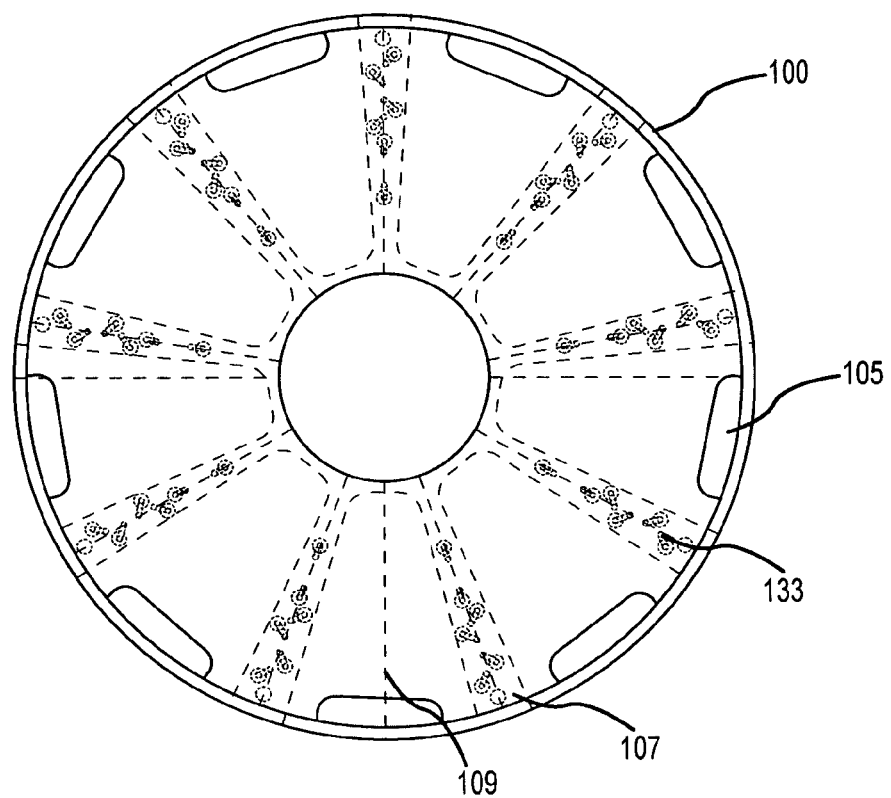
FIG. 3 is a plan view of the injector plate in a preferred embodiment.
Figure 4:
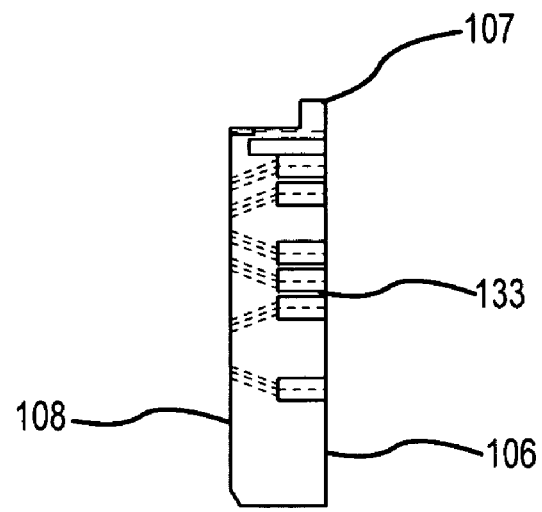
FIG. 4 is a cross-sectional view of the injector plate in a preferred embodiment.
Figure 5:
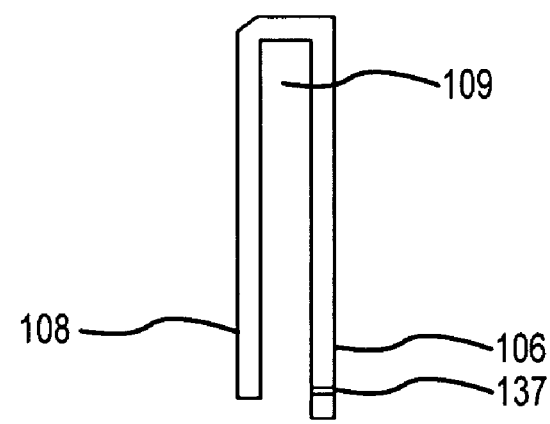
FIG. 5 is another cross-sectional view of the injector plate in a preferred embodiment; and, FIG. 6 is a perspective partial cross-sectional view of the injector plate of FIG. 3.

Referring now in detail to FIGS. 3-5, injector plate 100 in a preferred embodiment is shown. In a preferred embodiment, arrays of injectors 133 are positioned along radial axes of injector plate 100 thereby surrounding spintle injector 103 to allow uniform propellant distribution. In a preferred embodiment, array of injectors 133 are oriented so that pairs of injectors are positioned a distance apart as shown in FIG. 3, and inject liquid propellant at an angle approximately twenty degrees from the longitudinal axis of chamber 120 or normal. Array of injectors 133 allow intersection of the liquid fuel at a set distance away from injector plate 100. The point of intersection of at least two fuel streams impinging on one another creates a mist cloud. This allows the resulting mist clouds of the fuel from the injector plate and oxidizer from the spintle to mix thoroughly and enhances efficient combustion. In a preferred embodiment, injector plate 100 is made of stainless steel. In alternate embodiments, other material is used to meet the temperature and pressure demands of the combustion chamber.

Figure 6:
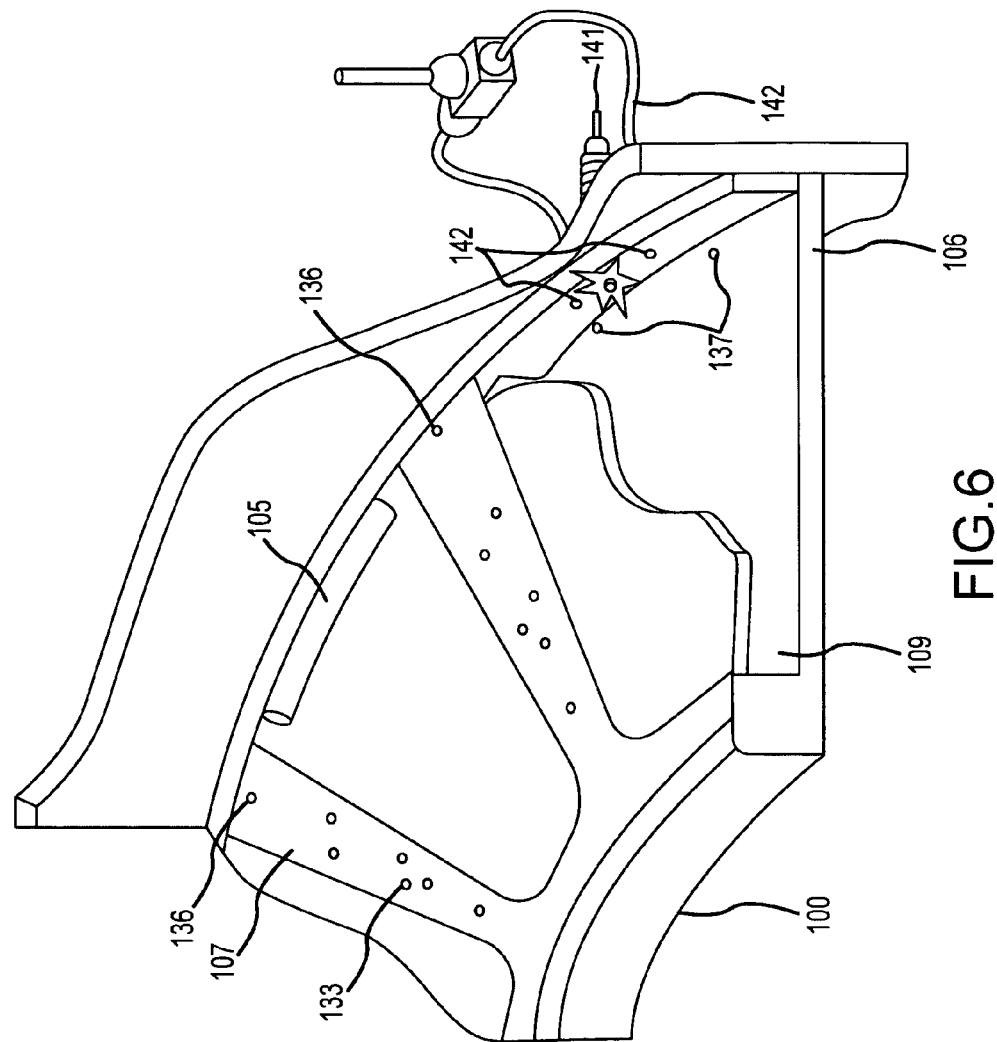

As shown in FIGS. 3 and 6, injector plate 100 in a preferred embodiment has nine (9) rib elements 107 creating nine (9) cavities 109 formed between rib elements 107 and below a top plate 108. Cavities 109 are exposed to chamber 120 through openings 105 machined into top plate 108 between each rib element 107. Openings 105 allow communication between chamber 120 and cavities 109 along the circumference of top plate 108, which allow harmonic resonance to be damped. The damping occurs as gases inside cavities 109 communicate with the internal pressure of chamber 120, creating an environment wherein the particular mass at openings 105 varies sinusoidally over time to create damping pressure at an integer of the half-phase of the frequency. The size of the hole in the injector plate in part determines the frequency of that particular cavity. In the preferred embodiment, three cavities are tuned to dampen the longitudinal frequency, three are tuned to dampen the radial frequency and three are tuned to dampen the lateral or circumferential frequency of the combustion chamber. Furthermore, an odd number for each mode (in this case, three) is chosen so as to dampen the second, third and greater modes for each axis. See Sutton, George P. and Biblarz, Oscar, *Rocket Propulsion Elements*, 7$^{th}$ ed., John Wiley & Sons, New York, N.Y., 2001, ISBN 0-471-32642-9, which is incorporated herein by reference.

Furthermore, as the pressure at openings 105 oscillates, gaseous oxygen may be introduced into cavities 109 to increase the damping gain. In a preferred embodiment, injectors distributing this gaseous oxygen 142 may be located at multiple points along the circumference of the injector plate 100 adjacent each of the cavities 109 and parallel to their radial axis. The system described above in a preferred embodiment thus provides damping of the mass of gaseous matter similar to the effect of a Helmholtz resonator. See Riley, K. F., Hobson, M. P., and Bence, S. J. (2002), *Mathematical methods for physics and engineering*, Cambridge University Press, chapter 19, ISBN 0-521-89067-5, which is incorporated herein by reference. See also http://www.phys.unsw.edu.au/~jw/Helmholtz.html for additional reference. In a preferred embodiment, pressure transducers are placed in cavities 109 to complete the feedback loop. In an alternate embodiment, one or more of the injectors distributing this gaseous oxygen 142 to the cavities may be used for injecting kerosene to facilitate ignition.

Referring to FIG. 6, each array of injector holes 133 is located on top plate 108 and through rib elements 107. In a preferred embodiment there are six injectors located on each rib element 107. In a preferred embodiment, array of injectors 133 includes opposing pairs of injectors so that each pair produces two intersecting streams, and allows liquid propellant to become impinged at points directly above rib element 107, and to each side of rib element 107. Differing quantities and orientations of arrays of injectors 133 are possible without deviating from the current invention and still allowing for even distribution of propellant inside the chamber. Along the outer circumference of base section 106 are thin-film bleeder holes 136, 137 for introducing liquid oxygen or another cryogenic coolant to insert 110 and cavities 109, which is in close communication with injector plate 100 along the outer circumference of base section 106. In a preferred embodiment, bleeder holes 136, 137 are proximate to the location of injectors of the gaseous oxygen 142 to allow mixing of the liquid fuel and gaseous oxygen. A spark plug 141 located inside each of the cavities 109 allows the engine to be ignited when the gaseous oxygen is introduced and the spark plug 141 is activated. In an alternate embodiment one or more of the injectors of gaseous oxygen 142 may instead be used to inject kerosene to facilitate ignition.

This arrangement of alternating rib elements 107 and cavities 109 with the openings 105 located on the circumference of the injector plate 100 adjacent the wall of the combustion chamber 120 is uniquely adapted to addressing the longitudinal, radial and lateral harmonic disturbance experienced during a typical combustion cycle. In a preferred embodiment, the geometry of the injector plate 100 creates nine separate cavities 109, which in turn provides three chambers for each of the three primary dampening modes. This further allows dampening to occur in the longitudinal, radial and lateral modes. The accumulator 121 may be pressurized by the presence of an inert gas, such as helium. Increasing or decreasing the pressure of the inert gas can further allow damping of longitudinal disturbance as well as system level oscillation, where the engine oscillates in pressure communication with the propellant feed lines and propellant tanks of the vehicle, known as "pogo" oscillations. Pogo oscillation is especially difficult for engine designers as the oscillation frequency is dependant on the specific vehicle the engine is mounted on. The presence of the accumulator 121 in this embodiment allows for an active feedback control to sense this mode of oscillation and compensate for it.

In a preferred embodiment this configuration provides several benefits for ignition and operation of the injectors. The gaseous oxygen injectors 142 may be used to provide independent axis oscillation damping and also serve to facilitate ignition. When the engine is starting up, fuel and liquid oxygen are allowed to enter the combustion chamber. The thin-film bleeder holes 136, 137 around the periphery of injector plate 100 inject a small fuel stream onto the chamber walls in order to cool them. This cooling is in addition to the ablation process of the insert. The thin-film bleeder holes 136, 137 are positioned such that their fuel streams are proximate to the gaseous oxygen injectors 142. During operation, the fuel stream leaves the cavities 109 through the openings 105 and continues through the chamber until it impinges against the chamber wall to be cooled. During start up of the engine, the gaseous oxygen injectors 142 may be pulsed such that the gaseous oxygen impinges on this fuel stream and deflects it onto the inside of each of cavities 109. This causes many fine fuel droplets to fly around in the gaseous oxygen environment. The spark plug 141 located between the gaseous oxygen injectors 142 may be activated, igniting this mixture. The combustion gases resulting flow out of the resonating chamber, into the main combustion chamber. Inside the main combustion chamber the propellant and liquid oxygen flows are being atomized by intersection of propellant and liquid oxygen streams from their respective injectors. Engine ignition commences at once. This geometry in a preferred embodiment of providing an odd number (in this case, three) of igniters further aids in eliminating circumferential oscillation during start up.

In a preferred embodiment, control of the system and method is achieved by integration with a processor-based or other control system. Individual algorithms may be employed with the control system to operate all or part of the control necessary to compensate for harmonic disturbance in the longitudinal, lateral or radial mode. Other means for controlling these elements of the invention are contemplated as well, including but not limited to providing the necessary input, output and control functions to a human operator.

In an alternate embodiment, top plate 108 of injector plate 100 may be comprised of a number of removable pieces, each corresponding to the geometry of cavities 109 to accommodate varying sizes of openings machined along the outer circumference of each piece. In this configuration, the pieces may be removable and replaceable to make openings 105 larger or smaller and thus tunable to varying frequencies of particular chamber constructions. In this alternate embodiment, these pieces are stainless steel, but in other alternate embodiment may be comprised of different materials.

In an alternate embodiment, a second plate may be introduced directly adjacent injector plate 100 on the chamber side. This second plate may have alternating ribs and cavities for either hiding or exposing array of injectors 133. By rotating the second plate certain injectors may be closed or opened and allow throttling of the engine in varying degrees. Means for automating this process are contemplated and considered within the scope of the present invention.

In another alternative embodiment, a heat-exchanging element is included adjacent to insert 110 and shell 130. This element may be used in addition to the graphite material to further cool the chamber walls during the combustion. In another alternative embodiment, insert 110 may be shaped to include cutouts to the internal contour to allow openings 105 to cavities 109 without requiring machining to top plate 108.

Thus, apparatus and methods to improve rocket engine combustion stability and reduce harmonic disturbance within the engine chamber have been described. Those with skill in the art will realize that while the description above has made reference to both preferred and alternate embodiments, various modifications to these embodiments would be made without departing from the spirit and scope of the invention, which should be understood with reference to the following claims and their equivalents.

What is claimed is:

1. An integral propulsion assembly comprising:
   a chamber;
   an injection plate having a top portion and a base portion connected by a series of rib elements forming a series of cavities between the rib elements in communication with the chamber;
   an injection element extending from the top portion of the injection plate and in communication with the chamber;
   a first array of injectors located along the series of rib elements for injecting liquid propellant into the chamber to achieve at least one first intersection point;
   a second array of injectors located circumferentially on the injection element for injecting liquid oxidizer into the chamber to achieve at least one second intersection point;
   at least one pressure transducer for measuring pressure located in at least one of the series of cavities;
   at least one injector for injecting gaseous oxidizer into the at least one of the series of cavities;
   wherein the at least one injector injects gaseous oxidizer into the at least one cavity and thereby dampen the lateral variable pressure within the at least one cavity;
   wherein the injection element extending from the injection plate dampens the radial variable pressure inside the chamber; and
   wherein the injection element and the injection plate dampen the longitudinal variable pressure inside the chamber.

2. The assembly of claim 1 further comprising an ablative lining at least partially congruent with the interior of the chamber.

3. The assembly of claim 1 wherein the chamber further comprises a liquid cooled fluid distribution system adjacent the chamber wall.

4. The assembly of claim 1 wherein the at least one first intersection point of the liquid propellant and the at least one second intersection point of the liquid oxidizer are in close communication with each other, thereby facilitating impingement of propellant and oxidizer.

5. The assembly of claim 1 wherein the injection plate is substantially cylindrical in shape with its outer circumference in communication with the interior of the chamber.

6. The assembly of claim 1 wherein the injection plate comprises nine cavities and nine rib elements.

7. The assembly of claim 1 wherein the at least one pressure transducer and the at least one injector are located in three cavities, each positioned diametrically opposing the other two along the radial axis of the injection plate.

8. The assembly of claim 1 further comprising an accumulator for distributing fuel to the injector plate assembly.

9. The assembly of claim 1 further comprising a graphite layer adjacent to the exterior of the chamber.

10. A rocket engine designed to compensate for harmonic frequencies within the engine chamber comprising:
    a chamber;
    an injection plate assembly positioned at one end of the chamber including a top portion and a base portion comprising a series of rib elements and a series of cavities between the rib elements in communication with the chamber through narrow openings along the outer circumference of the injection plate;
    an injection element extending from the top plate of the injection plate assembly and into the chamber;
    an accumulator for distributing liquid propellant to the injector plate assembly;
    a first array of injectors located along the series of rib elements for injecting liquid propellant into the chamber to achieve at least one first intersection point;
    a second array of injectors located circumferentially on the injection element for injecting liquid oxidizer into the chamber to achieve at least one second intersection point;
    at least one pressure transducer located in at least one of the series of cavities; and
    at least one injector for injecting gaseous oxidizer into the at least one of the series of cavities.

11. The rocket engine of claim 10 further comprising an ablative lining at least partially congruent with the interior of the chamber.

12. The rocket engine of claim 10 wherein the chamber further comprises a liquid cooled fluid distribution system integral with the chamber wall.

13. The rocket engine of claim 10 wherein the chamber further comprises a graphite layer adjacent to the outer circumference of the chamber.

14. The rocket engine of claim 10 wherein the injection plate assembly is substantially cylindrical in shape with its outer circumference in communication with the interior of the chamber.

15. The rocket engine of claim 10 wherein the injection plate assembly comprises nine cavities and nine rib elements.

16. The rocket engine of claim 10 wherein the injection plate assembly comprises nine cavities and nine rib elements and the at least one pressure transducer and the at least one injector are located in three cavities, each positioned diametrically opposing the other two along the radial axis of the injection plate assembly.

17. An integral propulsion assembly comprising:
    a chamber;
    an injection plate near a first end of the chamber;
    an injection element extending from the injection plate and axially into the chamber;
    a first array of injectors on the injection plate for injecting streams of a first propellant into the chamber toward first propellant stream intersection points, at which points the first propellant streams impinge to atomize the first propellant;
    a second array of injectors on the injection element for injecting streams of a second propellant into the chamber toward second propellant stream intersection points, at which points the second propellant streams impinge to atomize the second propellant; wherein the injection element extending from the injection plate and the chamber wall cooperate to dampen variations in the radial variable pressure inside the chamber; and wherein the injection element and the injection plate cooperate to dampen variations in the longitudinal pressure inside the chamber.

18. The assembly of claim 17 wherein:
    the chamber has a resonance frequency and a chamber diameter in the vicinity of the injection element;
    the injection element has a diameter; and
    further wherein the injector element diameter is sized relative to the chamber diameter to create a radial damping pressure frequency at an integer of the half-phase of the chamber resonance frequency.

19. The assembly of claim 17 further comprising:
    a nozzle throat near a second end of the chamber and spaced apart from the injector plate by a first distance to establish a chamber first longitudinal resonance frequency; and a distal end portion of the injection element, spaced apart from the nozzle throat by a second distance to establish a chamber second longitudinal resonance frequency, the second distance selected to create a longitudinal damping pressure frequency at an integer of the half-frequency of the chamber first longitudinal resonance frequency.

20. The assembly of claim 17 wherein the first propellant stream intersection points and the second propellant stream intersection points are aligned radially to facilitate mixing of first propellant with second propellant.

21. The assembly of claim 17 wherein the injection plate comprises:
   a top plate; and
   a base section connected to the top plate by a plurality of ribs, the ribs defining a plurality of cavities within the injection plate;
wherein the cavities are in communication with the chamber via openings through the top plate, whereby harmonic damping within the chamber occurs as gasses within the cavities communicate with gasses within the chamber.

22. The assembly of claim 21 further comprising:
   at least one transducer for measuring pressure located in at least one of the cavities; and
   at least one injector, responsive to signals from the transducer, for injecting gas into another one of the cavities, to dampen pressure variations within the other cavity.

23. The assembly of claim 22 wherein the plurality of cavities comprises a number of cavities equaling an integer multiple of three.

24. The assembly of claim 17 further comprising an accumulator for distributing propellant to the injector plate.

25. A rocket engine designed to compensate for harmonic frequencies within the engine chamber comprising:
   a chamber having a resonance frequency;
   an injection plate assembly at one end of the chamber, the plate assembly comprising:
      a top plate;
      a base section; and
      a plurality of ribs between the top plate and the base section and defining there-between a number of acoustic cavities, the number of acoustic cavities being an integer multiple of three, each cavity in communication with the chamber through an opening in the top plate;
   an injection element extending from the injection plate assembly and axially into the chamber;
   at least one pair of injectors on the top plate for injecting a first propellant into the chamber and toward a corresponding first propellant intersection point, at which point streams of first propellant impinge;
   at least one pair of injectors on the injection element for injecting a second propellant into the chamber and toward a corresponding second propellant intersection point, at which point streams of second propellant impinge;
wherein each acoustic cavity is in communication with the chamber via an opening through the top plate, whereby harmonic damping within the chamber occurs as gasses within the acoustic cavities communicate with gasses within the engine chamber to dampen longitudinal, radial, and circumferential chamber resonant frequencies.

26. The engine of claim 25 wherein:
   the at least one pair of injectors for injecting a first propellant comprises a plurality of paired injectors, each pair of injectors injecting a pair of streams of first propellant toward a corresponding first propellant intersection point where the impinging streams atomize the first propellant; and
   the plurality of paired first propellant injectors is arrayed along the ribs.

27. The engine of claim 26 wherein:
   the at least one pair of injectors for injecting a second propellant comprises a plurality of paired injectors, each pair of injectors injecting a pair of streams of second propellant toward a corresponding second propellant intersection point where the impinging streams atomize the second propellant; and
   the plurality of paired second propellant injectors is arrayed around a circumference of the injection element.

28. The engine of claim 25 wherein the openings in the top plate are adjacent the outside circumference of the injection plate assembly, and wherein during engine operation acoustic damping occurs as gas pressure within the acoustic cavities affects the internal pressure of the chamber as the mass of gasses at the openings varies approximately sinusoidally over time, thereby creating a damping pressure at an integer multiple of the half-phase of the chamber resonance frequency.

29. The engine of claim 28 further comprising at least one injector for injecting gas into at least one of the acoustic cavities to increase a mass damping gain of the cavity.

30. The engine of claim 28 wherein the injection plate assembly comprises nine acoustic chambers wherein three circumferentially equally spaced chambers are tuned to dampen the longitudinal resonance frequency of the chamber, three circumferentially equally spaced chambers are tuned to dampen the radial resonance frequency of the chamber, and three circumferentially equally spaced chambers are tuned to dampen the lateral resonance frequency of the chamber.

31. The assembly of claim 25 further comprising an accumulator for distributing propellant to the injector plate assembly, the accumulator controllably pressurizable with an inert gas to compensate for system-level oscillation within the engine.

* * * * *